(12) United States Patent
Langer et al.

(10) Patent No.: US 8,246,256 B2
(45) Date of Patent: Aug. 21, 2012

(54) HUB FOR A WHEEL BEARING UNIT

(75) Inventors: Roland Langer, Schwanfeld (DE); Ernst Masur, Untereuerheim (DE); Ralf Heiss, Schweinfurt (DE); Benno Fueller, Karlstadt (DE); Peter Niebling, Bad Kissingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 712 days.

(21) Appl. No.: 11/912,772

(22) PCT Filed: Apr. 19, 2006

(86) PCT No.: PCT/DE2006/000676
§ 371 (c)(1),
(2), (4) Date: Oct. 26, 2007

(87) PCT Pub. No.: WO2006/114083
PCT Pub. Date: Nov. 2, 2006

(65) Prior Publication Data
US 2008/0193071 A1    Aug. 14, 2008

(30) Foreign Application Priority Data
Apr. 28, 2005 (DE) .......................... 10 2005 019 731

(51) Int. Cl.
*F16C 13/02* (2006.01)
(52) U.S. Cl. ..................................................... 384/544

(58) Field of Classification Search .................. 384/544, 384/589; 29/898.061, 898.062; 301/105.1; 403/359.1–359.6; 464/178
See application file for complete search history.

(56) References Cited

U.S. PATENT DOCUMENTS

| 4,047,770 | A | * | 9/1977 | Korenhof et al. ............. 384/482 |
| 4,893,960 | A | * | 1/1990 | Beier et al. ...................... 403/24 |
| 6,146,022 | A |   | 11/2000 | Sahashi et al. |
| 6,497,515 | B1 | * | 12/2002 | Sahashi et al. ................ 384/544 |
| 6,574,865 | B2 | * | 6/2003 | Meeker et al. ........... 29/894.361 |

FOREIGN PATENT DOCUMENTS

| DE | 31 16 720 A | 10/1982 |
| DE | 36 36 243 A | 5/1988 |
| DE | 196 37 940 A | 3/1997 |
| GB | 2 122 724 A | 1/1984 |
| JP | 09 164 803 A | 6/1997 |
| JP | 2001 001710 A | 1/2001 |

* cited by examiner

*Primary Examiner* — Thomas R Hannon
*Assistant Examiner* — Phillip A Johnson
(74) *Attorney, Agent, or Firm* — Lucas & Mercanti, LLP; Klaus P. Stoffel

(57) ABSTRACT

A hub on a wheel bearing unit, which has at least one inner ring, sitting on the hub. The inner ring is axially retained on the hub by a collar, which has a toothing, formed from the hub. The inner ring has a radially inward broken-out section on the front face thereof and the broken-out section is filled with plastically displaced material from the collar such that the material of the inner ring at least engages in the broken-out section and the material in the broken-out section is enclosed in the radial direction by the inner ring.

6 Claims, 4 Drawing Sheets

HUB FOR A WHEEL BEARING UNIT

FIELD OF THE INVENTION

The invention relates to a hub for a wheel bearing unit having at least one inner ring which is seated on the hub, with the inner ring being held axially on the hub by means of a collar which is formed out of the hub, and the collar having a toothing, and with the inner ring having a broken-out section at the end side radially at the inside, and the broken-out section being filled with plastically displaced material of the collar in such a way that the material engages behind the inner ring at least in the broken-out section, and that the material in the broken-out section is encompassed by the inner ring in the radial direction.

BACKGROUND OF THE INVENTION

A hub of said type is described in DE 36 36 243 A1. The inner ring is held on the hub by a collar which is formed in one piece with the hub. The collar is formed out of an axial end section of the hub. To this end, the inner ring is slid onto its seat, and the end section is then expanded, turned over and provided with the toothing. The technology is preferably cold forming. In the process, the material of the collar is pressed into the end-side projection. A rotationally fixed connection is produced between the inner ring and the hub. The wheel bearing is clamped by means of the collar which is preloaded axially against the inner ring.

The material of the collar tends to escape radially outward, in particular as the toothing is formed. In addition to the forming tool, therefore, a sleeve-shaped auxiliary tool is used which forms a stop radially at the outside and thereby prevents the material from flowing away.

SUMMARY OF THE INVENTION

It is the object of the invention to create a hub which is simple and cost-effective to produce.

The object is achieved in that the toothing is formed at least proportionately in the material which is encompassed radially by the inner ring in the broken-out section. The toothing is therefore formed in that broken-out section of the material which is captively held radially by the inner ring. The material cannot escape radially during the forming of the toothing, since it is retained by the inner ring, and flows primarily into the dies of the tool, so that the teeth, in particular the load-bearing proportion thereof, are formed optimally.

The term "too thing" is to be understood to mean all profiles having axial broken-out sections and, adjacent thereto, gaps between the broken-out sections, by means of which a form-fitting, torque-transmitting connection can be produced with a corresponding mating profile.

Such profiles are for example spur or helical toothings composed of steel, non-ferrous metals and alloys or of other suitable materials.

Embodiments of the invention relate to the formation of the toothing on the collar and are described in more detail below on the basis of the drawings.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
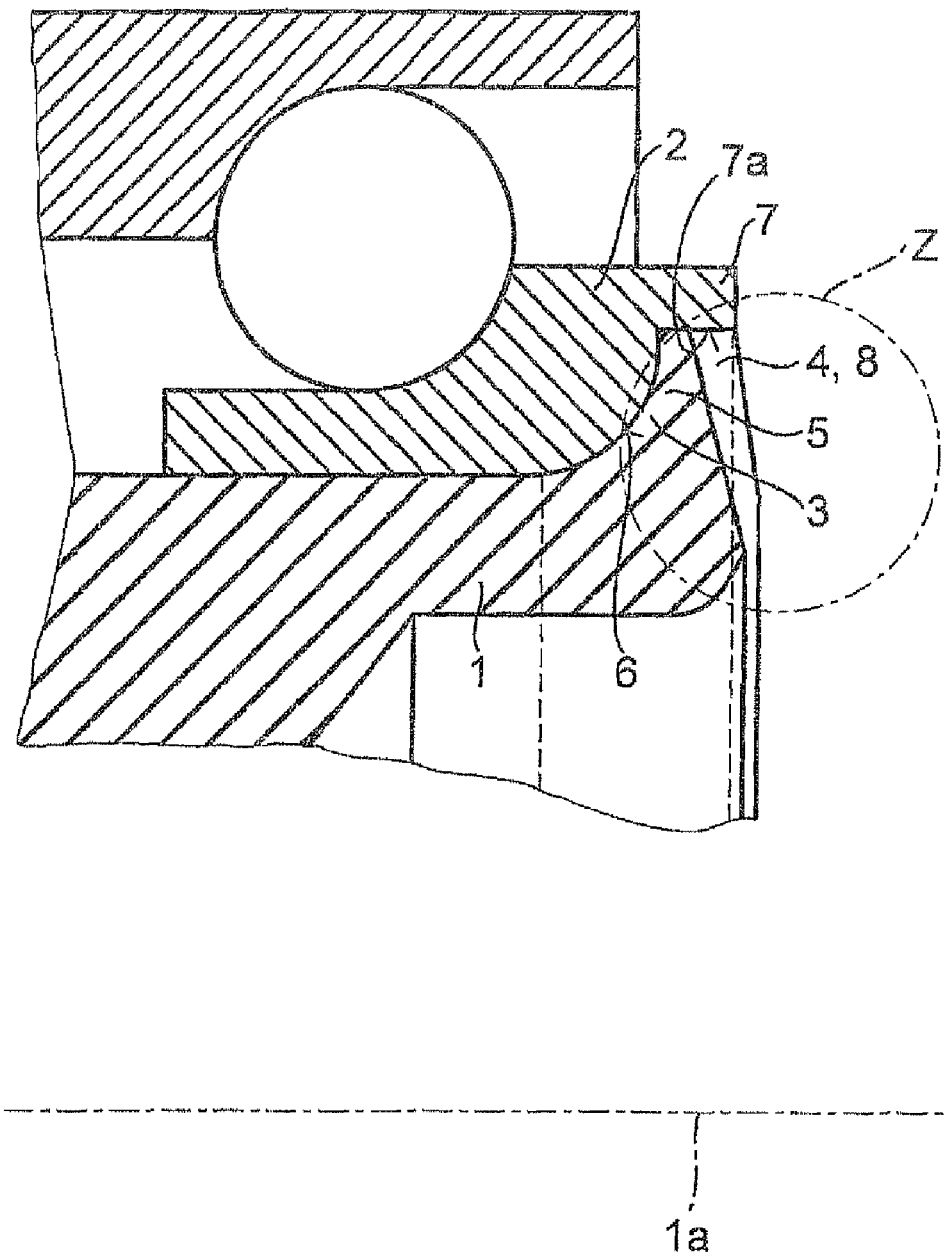
FIG. 1 is a partial cross-sectional view illustrating a hub of a wheel bearing unit.

FIG. 1 shows a partial view of a hub 1 of a partially illustrated wheel bearing unit with at least one inner ring 2 which is seated on the hub 1. The arrangement is illustrated in a longitudinal section along the rotational axis 1a of the hub 1. The inner ring 2 is held axially on the hub 1 by means of a collar 3 which is formed out of the hub 1. The collar 3 has a toothing 4 for a torque connection.

The inner ring 2 is provided radially at the inside with an end-side broken-out section 5 which is partially filled with material, which is plastically displaced by cold forming, of the collar 3. The broken-out section 5 runs in the shape of an annular groove, and the material in the broken-out section 5 runs in the shape of a head, around the rotational axis 1a of the hub 1. The material engages behind the inner ring 2 on the end face 6 of the broken-out section 5. The end face 6 is arched outward. The inner ring 2 has a radial flange 7 which radially delimits the broken-out section 5 with an inner cylindrical lateral surface 7a and encompasses the material in the broken-out section 5 in the radial direction. The teeth 8 of the toothing 4 are formed proportionately in the material which is encompassed by the radial flange 7.

Figure 1A:
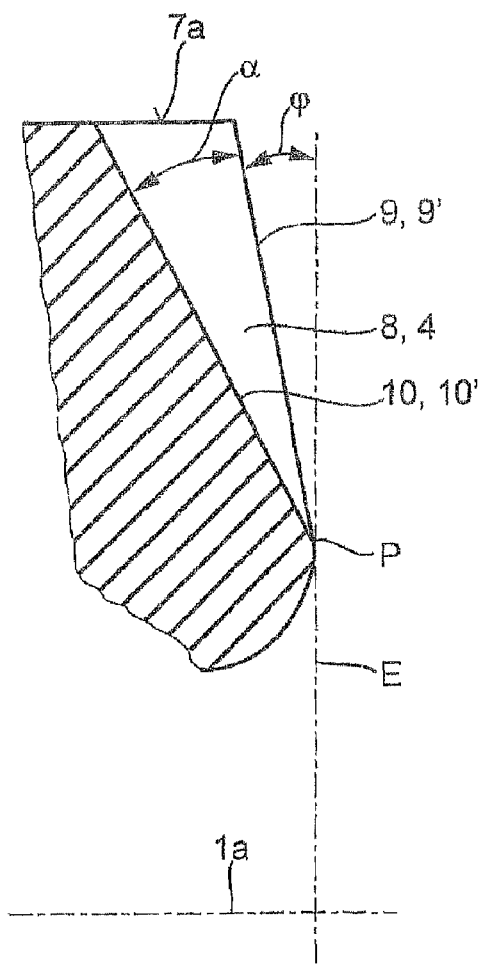
FIG. 1a illustrates detail Z of FIG. 1.

FIG. 1a shows the detail Z from FIG. 1 enlarged and not to scale. The teeth 8 are aligned longitudinally radially and adjacent to one another at the peripheral side around the rotational axis 1a. The outermost contour, which is remote from the tooth root 10, along the head 9 of each of the teeth 8 is described geometrically by tooth tip lines 9'. The tooth root line 10' is the geometric line at the transition of the tooth 8 into the material, and at the same time marks the apex 10 at the base of the tooth gap. At the apex point P, the respective tooth tip line 9' coincides with a tooth root line 10'.

In the toothing 4 according to FIG. 1 and FIG. 1a, the tooth root lines 10' and the tooth tip lines 9' enclose between them an acute angle, denoted by α, of any desired selectable magnitude. Furthermore, the tooth tip line 9' of the respective tooth is inclined, in the same direction as the tooth root line 10', away from the plane E toward the material of the collar by an acute angle φ of any desired selectable magnitude. The plane E is an imaginary vertical plane E which runs through the apex point P and which is penetrated perpendicularly by the rotational axis 1a of the hub. In this case, the plane E runs outside the toothing 4. The tooth tip lines 9' and the tooth root lines 10' run increasingly further apart from one another with increasing radial distance from P, and with increasing radial distance from the rotational axis 1a of the hub 1.

Figure 2:
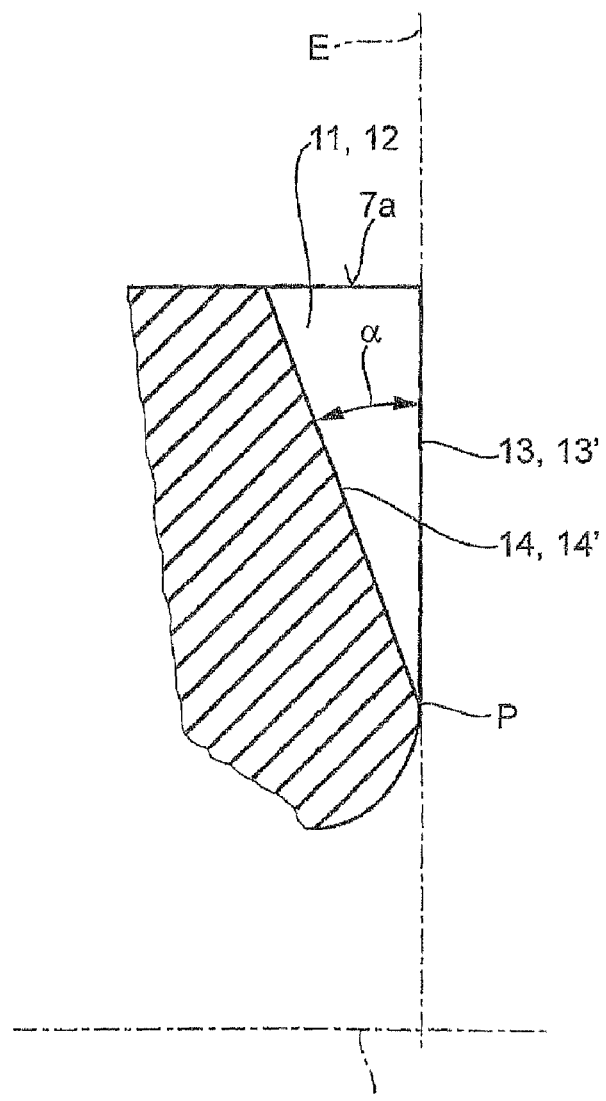
FIG. 2 illustrates the detail Z of FIG. 1 with a toothing where tooth tip lines of the teeth run in a vertical plane.

FIG. 2 shows the detail Z with a toothing 11 in which the tooth tip lines 13' of the teeth 12 run in the vertical plane E. The teeth 12 are aligned radially longitudinally and adjacent to one another at the peripheral side. The outermost contour, which is remote from the tooth root 14, along the tip 13 of each of the teeth 12 is described theoretically geometrically by a tooth tip line 13'. The tooth root line 14' is the geometric line at the transition of the tooth 12 into the material, and at the same time marks the apex 14 at the base of the tooth space. In the toothing 11 according to FIG. 2, the tooth root lines 14' and the tooth tip lines 13' enclose between them an acute angle, denoted by α, of any desired selectable magnitude, so that the respective tooth root line 14' is inclined away from the vertical plane E toward the material of the flange by the angle α. In this case, the plane E delimits the toothing 11 at the tip side. The tooth tip lines 13' and the tooth root lines 14' run increasingly further apart from one another with increasing radial distance from P, and with increasing radial distance from the rotational axis 1a of the hub 1.

Figure 3:
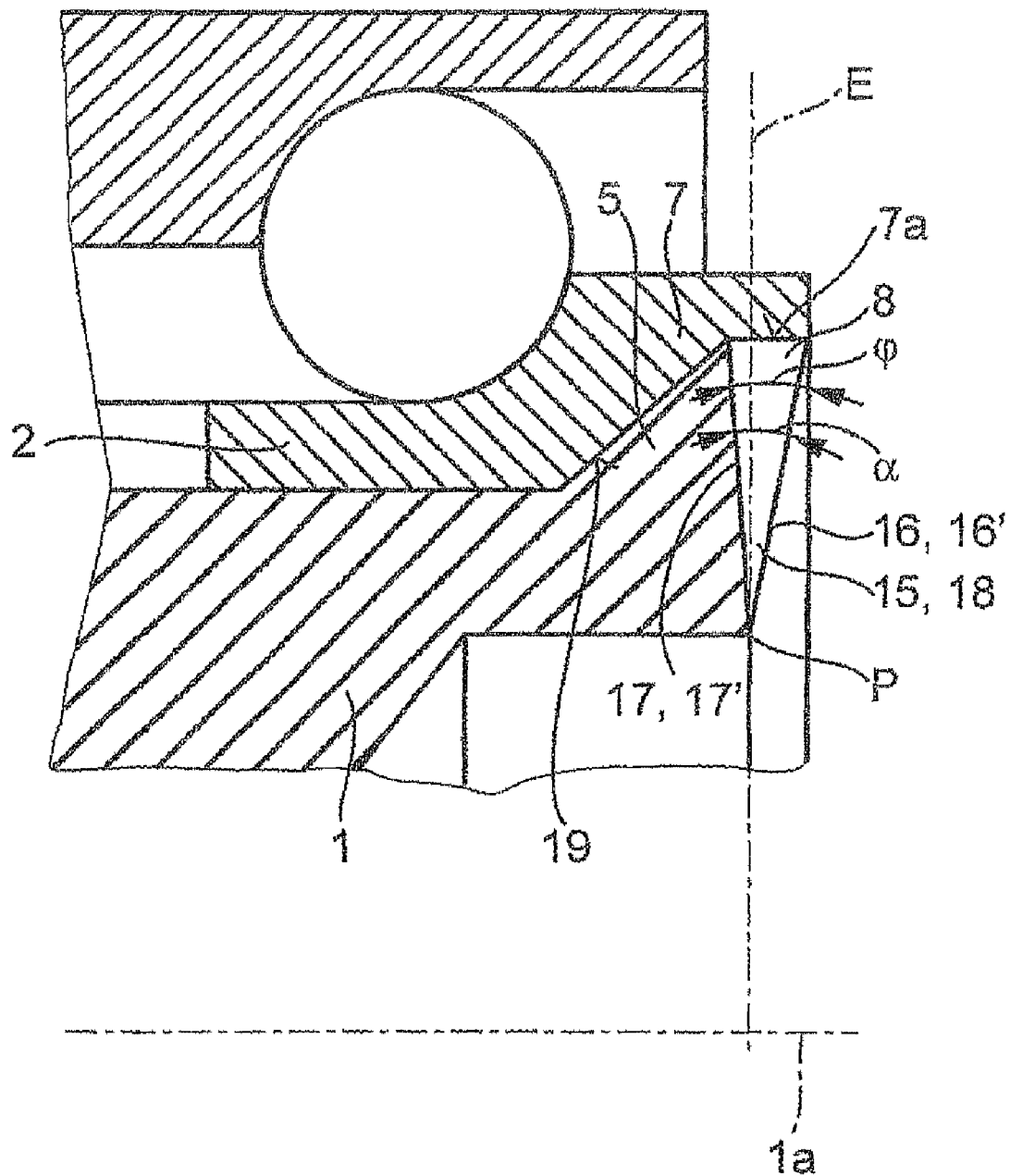
FIG. 3 illustrates a partial view of an alternate embodiment of a hub of a wheel bearing unit.

FIG. 3 shows a partial view of a hub 1 of a partially illustrated wheel bearing unit with at least one inner ring 2 which is seated on the hub 1. The arrangement is illustrated in a longitudinal section along the rotational axis 1a of the hub 1. In the broken-out section 5, an obliquely-running planar end face 19 is engaged behind by the material with a toothing 15. The teeth 18 are radially longitudinally aligned and are adjacent to one another at the peripheral side. The toothing 15 is radially completely encompassed by the flange 7 of the inner ring, so that the toothing 15 is formed entirely in the material which has been pressed into the broken-out section 5 during the forming of the collar.

The outermost contour, which is remote from the tooth root 17, along the head 16 of each of the teeth 18 is described theoretically geometrically by the tooth tip line 16'. The tooth root line 17' is the geometric line at the transition of the respective tooth 18 into the material, and at the same time marks the apex 17 at the base of the tooth gap. The tooth root lines 17' and the tooth tip lines 16' enclose between them an acute angle α of any desired magnitude.

The vertical plane E runs in the toothing 15 between the tooth tip line 16' and the tooth root line 17'. The respective tooth root line 17' is inclined away from the vertical plane E toward the material of the flange by the angle φ, and the tooth tip line 16' is inclined away from the plane E and from the material by the angle δ. The tooth tip lines 16' and the tooth root lines 17' run increasingly further apart from one another with increasing radial distance from P, and with increasing radial distance from the rotational axis 1a of the hub 1.

Figure 4:
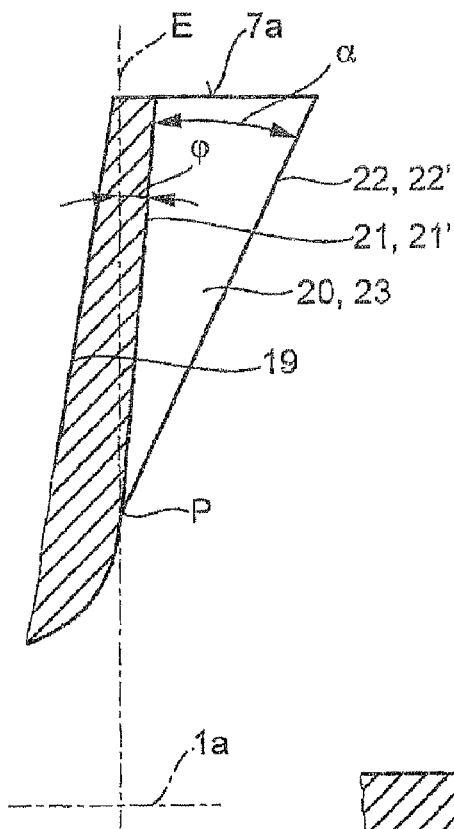
FIG. 4 illustrates the teeth of the toothing of the hub of FIG. 3.

The teeth 20 of the toothing 23 according to FIG. 4 are aligned longitudinally radially and adjacent to one another at the peripheral side. The outermost contour, which is remote from the tooth root 21, along the head 22 of each of the teeth 20 is described geometrically by tooth tip lines 22'. The tooth root line 21' is the geometric line at the transition of each tooth 20 into the material, and at the same time marks the apex 21 at the base of the tooth space. At the apex point P, the respective tooth tip line 22' coincides with a tooth root line 21'.

The tooth root lines 21' and the tooth tip lines 22' enclose between them an acute angle, denoted by α, of any desired selectable magnitude. Furthermore, the tooth tip line 21' of the respective tooth 20 is inclined, in the same direction as the tooth root line 22', away from the plane E and from the material of the collar by an acute angle φ of any desired selectable magnitude. The plane E is an imaginary vertical plane E which runs through the apex point P and which is penetrated perpendicularly by the rotational axis 1a of the hub. In this case, the plane E runs axially between the end face 19 of an inner ring and the teeth 20. The tooth tip lines 22' and the tooth root lines 21' run increasingly further apart from one another with increasing radial distance from P.

Figure 5:
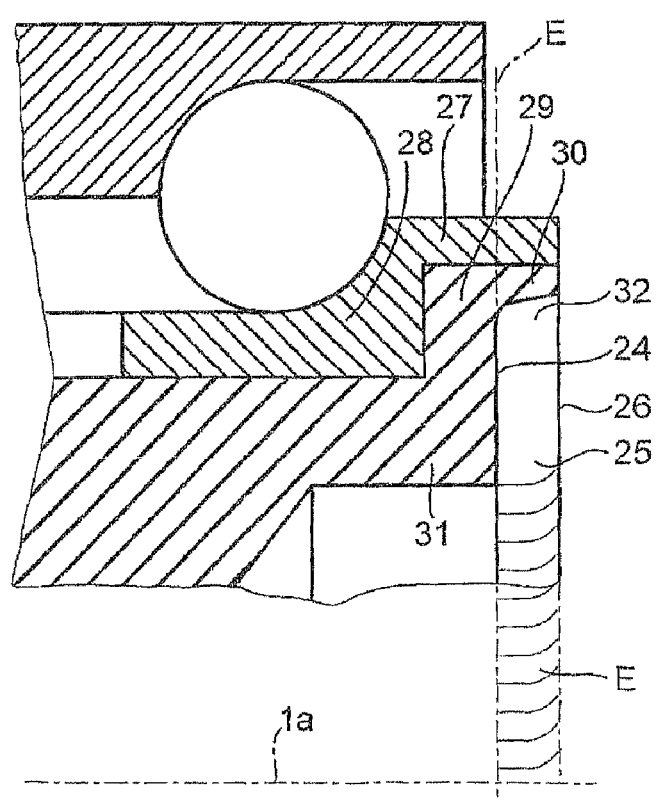

The tooth root lines 24 of the teeth 32 of the toothing 25 according to FIG. 5 run parallel to the tooth tip lines 26 and in each case parallel to or in any desired vertical planes E. Formed radially between the toothing 25 and the radial flange 27 of the inner ring 28 is a solid annular section 30 composed of the material which, during the forming of the collar 31, has been pressed into the broken-out section 29 of the inner ring 28 which is stepped at the end side. The annular section 30 surrounds the toothing 25 radially and is surrounded radially by the radial flange 27.

LIST OF REFERENCE SYMBOLS

1 Hub
1a Rotational axis
2 Inner ring
3 Collar
4 Toothing
5 Broken-out Section
6 End face
7 Radial flange
7a Inner cylindrical face
8 Tooth
9 Tooth tip
9' Tooth tip line
10 Tooth root
10' Tooth root line
11 Toothing
12 Tooth
13 Tooth tip
13' Tooth tip line
14 Tooth root
14' Tooth root line
15 Toothing
16 Tooth tip
16' Tooth tip line
17 Tooth root
17' Tooth root line
18 Tooth
19 End face
20 Tooth
21 Tooth root
21' Tooth root line
22 Tooth tip
22' Tooth lip lines
23 Toothing
24 Tooth root line
25 Toothing
26 Tooth tip line
27 Radial flange
28 Inner ring
29 Broken-out Section
30 Annular Section
31 Collar
32 Tooth

The invention claimed is:

1. A hub for a wheel bearing unit, comprising:
at least one inner ring which is seated on the hub, the inner ring being held axially on the hub by means of a collar which is formed out of the hub, the collar having a toothing, and the inner ring having a broken-out section disposed radially on an inside of the inner ring and a flange, which radially delimits the broken-out section with an inner cylindrical lateral surface that, as viewed in cross-section, has a uniform radius with respect to a rotational axis of the hub, the broken-out section being filled with plastically displaced material of the collar in such a way that the material engages behind the inner ring at least in the broken-out section, and that the material in the broken-out section is encompassed by the inner ring in the radial direction,
wherein the toothing is formed at least proportionately in the material which is encompassed radially by the flange of the inner ring in the broken-out section, such that the toothing is formed in a portion of the material which is captively held radially by the flange of the inner ring.

2. The wheel bearing unit as claimed in claim 1, wherein the broken-out section is a circumferential annular groove which runs around the rotational axis of the hub.

3. The wheel bearing unit as claimed in claim 1, further comprising: radially longitudinally aligned teeth, which are adjacent to one another at a peripheral side, on the collar, wherein tooth tip lines of the teeth run in a common imaginary vertical plane, with the vertical plane being penetrated perpendicularly by a the rotational axis of the hub.

4. The wheel bearing unit as claimed in claim 1, further comprising: a spur toothing or helical toothing having radially longitudinally aligned teeth, which are adjacent to one another at a peripheral side, on the collar, wherein tooth root lines of the teeth are inclined at an acute angle with respect to a common imaginary vertical plane, with the vertical plane being penetrated perpendicularly by the rotational axis of the hub.

5. The wheel bearing unit as claimed in claim 1, further comprising: a spur toothing or helical toothing having radially longitudinally aligned teeth, which are adjacent to one another at a peripheral side, on the collar, wherein tooth tip lines of the teeth are inclined at an acute angle with respect to a common imaginary vertical plane, with the vertical plane being penetrated perpendicularly by the rotational axis of the hub.

6. The wheel bearing unit as claimed in claim 1, further comprising: a spur toothing or helical toothing having radially longitudinally aligned teeth, which are adjacent to one another at a peripheral side, on the collar, wherein the tooth root lines and tooth tip lines enclose an acute angle between one another, with the tooth tip lines and the tooth root lines running increasingly further apart from one another with increasing radial distance from the rotational axis of the hub.

* * * * *